(12) United States Patent
Blair et al.

(10) Patent No.: US 7,869,067 B2
(45) Date of Patent: Jan. 11, 2011

(54) COMBINATION SCANNER AND IMAGE DATA READER SYSTEM INCLUDING IMAGE MANAGEMENT AND SOFTWARE

(75) Inventors: John Blair, San Ramon, CA (US); Ron van Os, Morrison, CO (US)

(73) Assignee: Visioneer, Inc., Pleasanton, CA (US)

( * ) Notice: Subject to any disclaimer, the term of this patent is extended or adjusted under 35 U.S.C. 154(b) by 1538 days.

(21) Appl. No.: 09/924,227

(22) Filed: Aug. 7, 2001

(65) Prior Publication Data

US 2002/0075524 A1 Jun. 20, 2002

Related U.S. Application Data

(60) Provisional application No. 60/242,039, filed on Oct. 20, 2000.

(51) Int. Cl.
*G06F 3/12* (2006.01)
(52) U.S. Cl. ............... 358/1.15; 358/474; 358/523; 358/450; 382/190
(58) Field of Classification Search ............ 358/505, 358/1.15, 501, 474, 468, 442, 444, 486, 450, 358/453, 523, 1.16; 345/530; 709/222; 705/26, 14; 382/190, 278; 707/203
See application file for complete search history.

(56) References Cited

U.S. PATENT DOCUMENTS

| | | | | |
|---|---|---|---|---|
| 3,947,666 A * | 3/1976 | Carlson | ............ | 235/454 |
| 4,604,686 A * | 8/1986 | Reiter et al. | ............ | 703/25 |
| 5,223,329 A * | 6/1993 | Amann | ............ | 428/198 |
| 5,283,657 A | 2/1994 | Ichikawa | ............ | 358/296 |
| 5,506,692 A * | 4/1996 | Murata | ............ | 358/442 |
| 5,532,844 A * | 7/1996 | Kagami et al. | ............ | 358/468 |
| 5,535,017 A * | 7/1996 | Hideaki | ............ | 358/444 |
| 5,610,383 A * | 3/1997 | Chumbley | ............ | 235/386 |
| 5,633,678 A * | 5/1997 | Parulski et al. | ............ | 348/231.5 |
| 5,752,040 A * | 5/1998 | Kaneko et al. | ............ | 717/170 |
| 5,790,278 A * | 8/1998 | Ehrne et al. | ............ | 358/496 |
| 5,805,294 A | 9/1998 | Furuoya | ............ | 358/296 |
| 5,923,437 A * | 7/1999 | Itoh | ............ | 358/401 |
| 6,049,636 A * | 4/2000 | Yang | ............ | 382/289 |
| 6,076,076 A | 6/2000 | Gottfreid | ............ | 705/45 |
| 6,084,824 A * | 7/2000 | Farr | ............ | 365/234 |
| 6,111,659 A * | 8/2000 | Murata | ............ | 358/296 |
| 6,192,379 B1 * | 2/2001 | Bekenn | ............ | 715/206 |
| 6,213,395 B1 * | 4/2001 | Dejaeger et al. | ............ | 235/383 |
| 6,301,020 B1 | 10/2001 | Dow | ............ | 358/473 |
| 6,344,906 B1 | 2/2002 | Gatto | ............ | 358/443 |

(Continued)

*Primary Examiner*—Negussie Worku

(57) ABSTRACT

Apparatus and methods for automatic, computer-based image management, including reading, transfer, and storage, and to related software for acquisition, transfer, editing, processing, copying, and archiving of images by the apparatus in accord with the methods. More particularly, the invention comprises image input devices of which specific examples include digital scanners, digital media readers, and a combination of the two, and software that makes possible the complete processing and archiving of digital images with the press of a single button or the act of inserting the media in the device. The inventive processing and archiving image management hardware and software system includes non-camera digital image acquisition, data transfer, display, manipulation (including cropping, adjusting colors, and other such editing), storage, thumbnailing, printing, and electronic transmittal of processed digital image data. In addition to replicating the traditional photographic film development process for digitally acquired images in a software enablement, the inventive image management software adds substantial functional features in the context of user-friendly ease and speed of use.

4 Claims, 8 Drawing Sheets

U.S. PATENT DOCUMENTS

| | | | |
|---|---|---|---|
| 6,388,778 B1 | 5/2002 | Ko-Chien | 358/497 |
| 6,540,137 B1* | 4/2003 | Forsythe et al. | 235/383 |
| 6,583,799 B1* | 6/2003 | Manolis et al. | 715/838 |
| 6,598,790 B1* | 7/2003 | Horst | 235/383 |
| 6,697,073 B1* | 2/2004 | Kadota | 345/501 |
| 6,700,773 B1* | 3/2004 | Adriaansen et al. | 361/680 |
| 6,717,702 B1* | 4/2004 | Yamauchi et al. | 358/497 |
| 6,748,365 B1* | 6/2004 | Quinlan et al. | 705/14 |
| 6,751,780 B1* | 6/2004 | Neff et al. | 715/247 |
| 6,980,332 B2* | 12/2005 | Simske | 358/445 |
| 7,098,942 B1* | 8/2006 | Nihei | 348/207.99 |
| 7,167,254 B1* | 1/2007 | Abe | 358/1.15 |
| 7,437,019 B2* | 10/2008 | Kita et al. | 382/296 |
| 2001/0000405 A1 | 4/2001 | Gray | 235/375 |
| 2001/0000979 A1 | 5/2001 | Han | 358/474 |
| 2001/0015375 A1* | 8/2001 | Swartz et al. | 235/383 |
| 2001/0021979 A1* | 9/2001 | Ito | 713/189 |
| 2001/0034806 A1 | 10/2001 | Dow | 710/129 |
| 2001/0049633 A1* | 12/2001 | Yoshida et al. | 705/26 |
| 2001/0049635 A1 | 12/2001 | Chung | 705/26 |
| 2002/0018130 A1 | 2/2002 | Suemoto | 348/231 |
| 2002/0033974 A1 | 3/2002 | Chen | 358/474 |
| 2003/0041284 A1* | 2/2003 | Mambakkam et al. | 714/15 |
| 2004/0193765 A1* | 9/2004 | Hsiao et al. | 710/72 |
| 2005/0041459 A1* | 2/2005 | McDonald | 365/154 |
| 2006/0109507 A1* | 5/2006 | Murata | 358/1.15 |
| 2006/0136996 A1* | 6/2006 | Wang et al. | 726/4 |

* cited by examiner

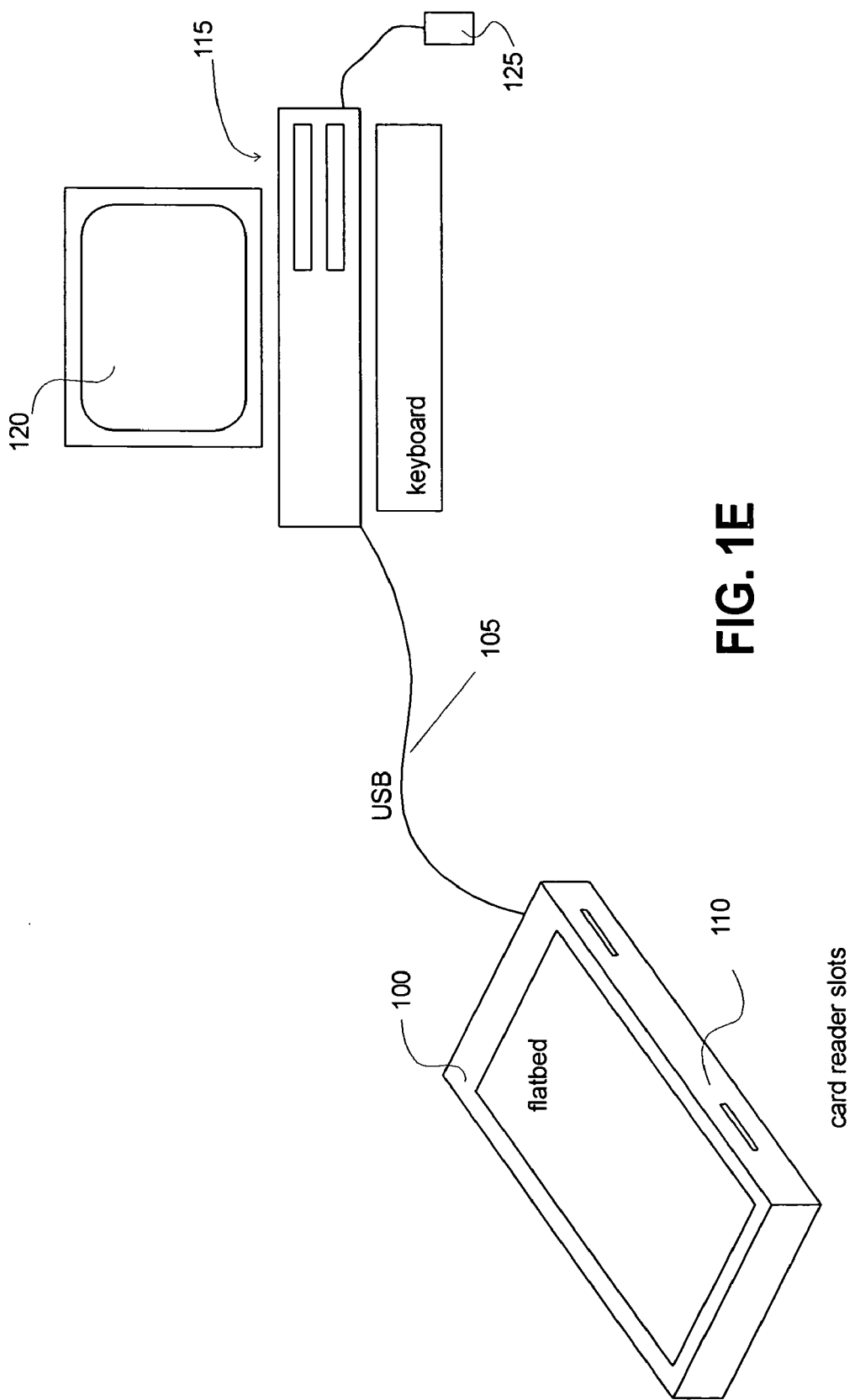

COMBINATION SCANNER AND IMAGE DATA READER SYSTEM INCLUDING IMAGE MANAGEMENT AND SOFTWARE

CROSS REFERENCE TO RELATED APPLICATION

This application is related to and claims priority of Provisional Application Ser. No. 60/242,039 titled COMBINATION SCANNER AND IMAGE DATA STORAGE, IMAGE READER, IMAGE DATA HANDLING SYSTEM, SOFTWARE THEREFOR, AND INTERNET BASED IMAGE-HANDLING METHOD filed by the inventors hereof on Oct. 20, 2000 under 35 USC. §119.

FIELD OF THE INVENTION

The invention relates to apparatus and methods for automatic, computer-based image management, including reading, transfer, and storage, and to related software for acquisition, transfer, editing, processing, copying, and archiving of images by the apparatus in accord with the methods. More particularly, the invention is directed to the use of desktop image acquisition peripherals, primarily removable media readers alone or in combination with digital scanners to automatically acquire and transfer images for transport (e.g., e-mail), editing, processing, archiving, copying, and printing.

BACKGROUND

Once consumers capture images with their cameras, whether digital or traditional film, they can have prints made from those images, although the methods by which the captured images become printed pictures differs greatly. The consumer also stores the physical prints, and in the case of traditional cameras, can store the negatives. Similarly, in the case of digital images, the consumer can store the files on computer media: hard drives, CD-ROM drives, or other storage devices. Generally, however, consumers using traditional cameras have no simple way of archiving the images on their computer.

Archiving traditional film images involves storage of prints in boxes or photo albums, or digitizing the images for archiving on a computer. Electronic media recordings, received from the professional processor make this step easier, although the software to automatically archive images typically is not user friendly. In cases where the consumer did not order electronic media, or where the consumer desires to archive older prints made before the availability of electronic media, the prints can be scanned into the computer using a digital scanner. Such scanners, and their necessary software systems, are discussed below.

Digital Scanners

Consumers can scan prints, both old and new, into computers using digital scanners and associated software. Typical scanners have a variety of features that determine their quality and simplicity of use, including scanning resolution, color depth, one-touch buttons, and other features, each of which is discussed below. Scanners also allow consumers to scan documents and non-photographic images into a computer for further processing. Documents can be converted from image files into text and electronic documents, editable by standard word processing programs. Sketches and drawings can be turned into electronic images.

Scanning Resolution:

The optical resolution of the images acquired by digital scanners is a function of the number of pixels in the CCD/CIS unit of the scanner. Scanning is done in a Cartesian mode, i.e., a linear array of pixels are mounted on a bar transverse to the longitudinal (vertical) axis of the scan area; the bar is moved as a unit along a path normal to the orientation of the bar (or the image being scanned is moved relative to the bar). A pixel is a small area on the surface of an image sensor that is sensitive to light. The pixel measures the intensity (brightness) of the image and the scanner forms an image from the combination of pixels. In that way, the number of pixels on the scanner's image sensor bar determines the horizontal optical resolution of the scanner. The distance the bar or paper advances between acquisitions determines the vertical resolution. For example, a scanner with a resolution of 600 dots per inch (dpi).times.1200 dpi has 600 pixels on its sensor bar which moves $\frac{1}{1200}$ of an inch between each acquisition. Together, the horizontal and vertical resolutions constitute the optical resolution and determine the level of detail that the scanner can capture. Typical digital scanners today provide optical resolutions around 600.times.1200 dpi, with a few models offering optical resolutions of 1200.times.2400 dpi. Those resolutions are expected to increase with improvements in scanning technology.

Color Depth:

Color depth is ability of the sensor in the scanner to capture accurate color. The sensor captures a combination of three colors (red, green, and blue) and can capture a certain number of shades of each of those colors. The most common scanner sensors capture eight bits of color resolution (two to the eighth power or 256 shades of each color). Today's scanners are capable of capturing eight, ten, or twelve bits of resolution per color. These color depths result in images containing 16.7 million (24-bit, or three 8-bit) colors to 68.7 billion (36-bit, or three 12-bit) colors. Although some new scanners are capable of 42-bit images, most use software to approximate the colors above 36-bits and a few use software to create 48-bit images.

Many scanners scan at a high internal resolution but output the image to the computer at a much lower resolution. The high resolution scanning creates digital image files that are often immense and require the scanner to scan very slowly because of the limited data transfer capabilities between the scanner and the host system. This limitation is dependent upon the transfer protocol used, i.e. USB, EPP or SCSI. There are a variety of compression functions that can speed the transfer, e.g., reducing the final image color depth, using a JPEG compression scheme to reduce the file size, or other methods of reducing the file size. In these ways, the scanner can send the image to a computer much more quickly.

Exemplary Commercially Available Scanner Technology:

By way of example, the Visioneer One Touch™. 8800 Scanner (8800) (Visioneer, Inc., Pleasanton, Calif.) is a digital flatbed scanner with dedicated function buttons that work with integrated software to make scanning tasks simple and fast. The prime features of the 8800 include J.E.T. compression, a proprietary system that uses a compression engine, consisting of one or more compression algorithms, to allow the scanner to complete scans much faster than normal by using various degrees of JPEG compression. The algorithms used for JPEG compression allow consumers to select between the highest image quality and the fastest scanning speed.

The 8800 is completely self-configuring, requiring only that the consumer install the software and plug in the scanner. After that, the software configures the computer in the background. Once connected, the scanner allows the consumer to scan images by placing an image on the scanner glass and touching a single "scan" button. The background scanning software creates an electronic image file and places the scanned, digital image wherever the consumer decides, e.g., in a default directory on the computer or directly to a computer network. A second software-controlled button on the scanner allow a single press of a selected, dedicated, button to instruct the computer to accept a scanned image and send it to a printer. A third dedicated button transmits the image via fax software (with only a telephone number input needed) and allows the consumer to send the image to any fax machine. A fourth dedicated button runs the digital image file (if the image is an image of a document that includes text) through an Optical Character Recognition (OCR) program to convert the portions of the image that are of text into actual text data for display or editing, as text. A fifth dedicated button labeled "e-mail" creates an attachment image file and attaches it to an e-mail document that the consumer need only address to an e-mail recipient. The Visioneer Model 8800 hardware includes a sixth button, labeled "custom," a software-configurable function button that allows the consumer to define the actions taken by the hardware/software system when that button is pressed. The software further allows the consumer to reprogram any of the pre-programmed buttons to activate whatever custom function the consumer selects beforehand.

Removable Media

There are several basic types of removable electronic or magnetic data storage media currently available for digital imaging. These currently include, but are not limited to, Compact Flash Memory cards, Smart Media cards, PC Cards (PCMCIA Cards), Memory Sticks, Multi Media cards, Secure Digital cards, and the like. The consumer can insert these various media "cards" into dedicated special-purpose card readers that transfer images contained in the cards to a computer. Each of the media cards uses its own proprietary technology to accomplish the same storage task.

"Digital film" is the generic term that the field has adopted for such removable media cards designed specifically for use in digital cameras. Current digital film readers typically consist of a cable and a device through which software on a computer can download the digital image data to the computer for creating a file and for processing. Many cameras can also act as digital film readers in that they can directly transfer to computers the digital image data that they have stored on inserted digital film. Such cameras, however, are typically limited in battery life and transfer speed, and the camera must be linked to the computer for the entire time it takes for the transfer. Accordingly, such transfers are inconvenient, and consumers consequently purchase separate card readers to attach to their computers.

Photo Printers and Scanners

Some currently available computer printers now include digital-film readers built into the printer body. As stand-alone devices, these printers can read certain media and immediately, without a computer, print the image files that are stored on the media. The Lexmark/KODAK Model PM100 printer can read some digital film, namely, Compact Flash and Smart Media cards. Special features on the printer allow the consumer to size, crop, and, to a very limited degree, edit images directly on the printer. Consumers can also print out an index of all the images stored on their removable media cards. In addition, the KODAK Model PM100 printer permits direct printing of image files from Iomega Zip disks, and permits transfer of the image data files to an Iomega Zip disk, without a computer interface. The Microtek (Redondo Beach, Calif.) ImageDeck is a scanner connected to an Iomega Zip drive that allows consumers to save scanned images on Iomega Zip disks.

Although the above technologies are currently available on the market, there is no integration of these products into a simple, easy to use, single solution for transferring both traditional photos and digital images into consumer computers and allowing easy archiving. There is thus an unmet need in the art for a more comprehensive integrated hardware and software system.

The Invention Summary, Including Objects and Advantages

The invention is directed to digital image acquisition and transfer devices, image data storage, image data handling and management, hardware control, image archiving, and paper-to-electronic-form-image document conversion and operational software therefor. More particularly, the invention comprises image input devices of which specific examples include digital scanners, digital media readers, or a combination of the two, and software that makes possible the complete processing and archiving of digital images with the press of a single button or the act of inserting the media in the device. The inventive processing and archiving image management includes non-camera digital image acquisition, data transfer, display, manipulation (including cropping, adjusting colors, and other such editing), storage, thumbnailing, printing, and electronic transmittal of processed digital image data. In addition to replicating the traditional photographic film development process for digitally acquired images in a software enablement, the inventive image management software adds substantial functional features in the context of user-friendly ease and speed of use.

The inventive hardware and software provide a system for uploading digital images from scanned prints, negatives, or digital film via the inventive hardware. The inventive system converts the raw, digitized images into standard computer files, such as JPEG files, which permits professional printing by sending the image files to a printer or to a professional printing service, such as PhotoWorks. Moreover, in the embodiment that employs a digital scanner to scan prints or negatives, the inventive hardware and software system allows the traditional film camera user to digitize images from the traditional film prints and negatives, thereby extending the inventive processing to traditional film.

The inventive system apparatus is described by reference to a scanner, such as the Visioneer 8800 by way of example and not by way of limitation. In a first embodiment, the apparatus aspect of the invention comprises a digital scanner incorporating at least one digital film reader ("card" media reader), linked to, and logically controlled by, the inventive software. The scanner preferably supports an improved image resolution by increasing the optical resolution to 1200.times.4800 dpi by employing a tightly packed sensor bar that can read 1200 dpi (1200 pixels per inch of length of the bar) and moves $\frac{1}{4800}$th of an inch between lines of scanning. The inventive apparatus, however, is not limited to the presently preferred image resolution and can be any typical scanner resolution, including future higher resolution scanners. In addition, the preferred scanner includes a 42-bit color sensor that optically captures 42-bits of color depth, which can be enhanced electronically to a 48-bit output. The scanner subassembly of the invention can scan images at 42-bit resolution, and can transfer the acquired image data to the computer without degrading the image color, providing a realistic color rendering.

In this first embodiment, the digital film reader comprises at least one removable media reader that transfers image data between the digital film and the inventive software. The hardware and software system of the invention automatically detects the insertion of the media into the one or more readers and routes the image data to the pre-selected application, as directed by the dedicated hardware or software button selected.

The inventive hardware can support one or more digital film readers. The hardware can be connected to the computer system through a USB, FireWire, SCSI, IEEE 1394, or a functionally equivalent port. The inventive hardware contains an internal seven port USB hub, with the scanner and one or more digital film readers permanently connected as USB peripherals. In this way, the inventive hardware can optionally have one or more available USB ports to which other USB peripherals, including digital cameras, can be connected.

The digital film readers included in this hardware embodiment can be set up, by the software of the system, to be recognized by the attached computer system as separate removable media drives. Thus, once installed, the inventive apparatus is reflected on the computer as at least one removable media disk drive, to which a letter is assigned by the computer operating system. As such, the computer can access any files on inserted digital film. The computer can thus read and write files to the digital film, and such files can include not only digital image files, but also any other files.

The method by which the software system enables the computer to access the digital film is as if that film is a removable hard drive, thus allowing the computer direct control of digital film still resident in a digital camera. There is then full computer access to the digital film and files can be read or written to, including image data files, document files, and executable files.

Once the apparatus system of the invention either scans an image or reads digital image data from digital film, the software system automatically processes the images in an essentially identical manner. In other words, the software system treats both scanned images and digital camera/digital film pictures in a common manner, once the image data files are acquired.

The software system manages the image data transfer via a menu of destination/action choices, which are enabled both as on-screen menu choices and as dedicated hardware buttons. The choices include the following exemplary transfers (via clickable button images or other icons) of the image data file: to a hard drive either on the local computer or anywhere on a network (for archiving or temporary storage); to a printer; to fax software that subsequently asks for a telephone number and sends the image data as a fax; to an OCR program to convert any text that may be in image format to editable text; to an e-mail program to send the image as an attachment to an e-mail; to any other application that the consumer selects, e.g., PhotoShop (for image manipulation and management); or to directly send images to an associated professional quality photographic processing company, such as PhotoWorks. For local printing, the software system sends the image to a local printer directly connected to the host computer, or via LAN or WAN network. For remote printing, the software system sends the image over the Internet.

In a second embodiment, the scanner may be omitted, leaving a device with at least one digital film reader and the several described one-touch buttons. The digital image data from the reader is processed as described above by the inventive software.

In a third embodiment, the hardware one-touch buttons may be omitted, leaving a device with at least one digital film reader that works automatically in concert with the inventive software. The functionality of this embodiment includes all the inventive software-controlled functionality as described above.

BRIEF DESCRIPTION OF THE DRAWINGS

The invention is described in more detail by reference to the drawings in which:

FIG. 1E is a depiction of the inventive scanner as connected via a USB port to a computer;

FIG. 2 is a software layout illustrating the inventive, software-enabled process that is initiated upon insertion of digital film into the media reader, either as a stand-alone device or in combination with a scanner;

FIG. 3 is a software layout illustrating the inventive process initiated upon pressing one of the hardware buttons;

FIG. 4 is a software layout illustrating the component architecture of the software system;

FIG. 5 is a software layout illustrating the component architecture that relates to the software component that allows the consumer to select archived images to send to a professional printing service (e.g., PhotoWorks)

DETAILED DESCRIPTION, INCLUDING THE BEST MODES OF CARRYING OUT THE INVENTIONS

The following detailed description illustrates the invention by way of example, not by way of limitation of the principles of the invention. This description will clearly enable one skilled in the art to make and use the invention, and describes several embodiments, adaptations, variations, alternatives, and uses of the invention. The description includes what are presently believed to be the best modes of carrying out the invention.

In this regard, the invention is illustrated in several figures (and tables where included), and is of sufficient complexity that the many parts, interrelationships, process steps, and sub-combinations thereof simply cannot be fully illustrated in a single patent-type drawing or table. For clarity and conciseness, several of the drawings show in schematic, or omit, parts or steps that are not essential in that drawing to a description of a particular feature, aspect or principle of the invention being disclosed. Thus, the best mode embodiment of one feature may be shown in one drawing, and the best mode of another feature will be called out in another drawing. Process aspects of the invention may also be described by reference to one or more examples, which are merely exemplary of the many variations and parameters of operation under the principles of the invention.

Figure 1A:
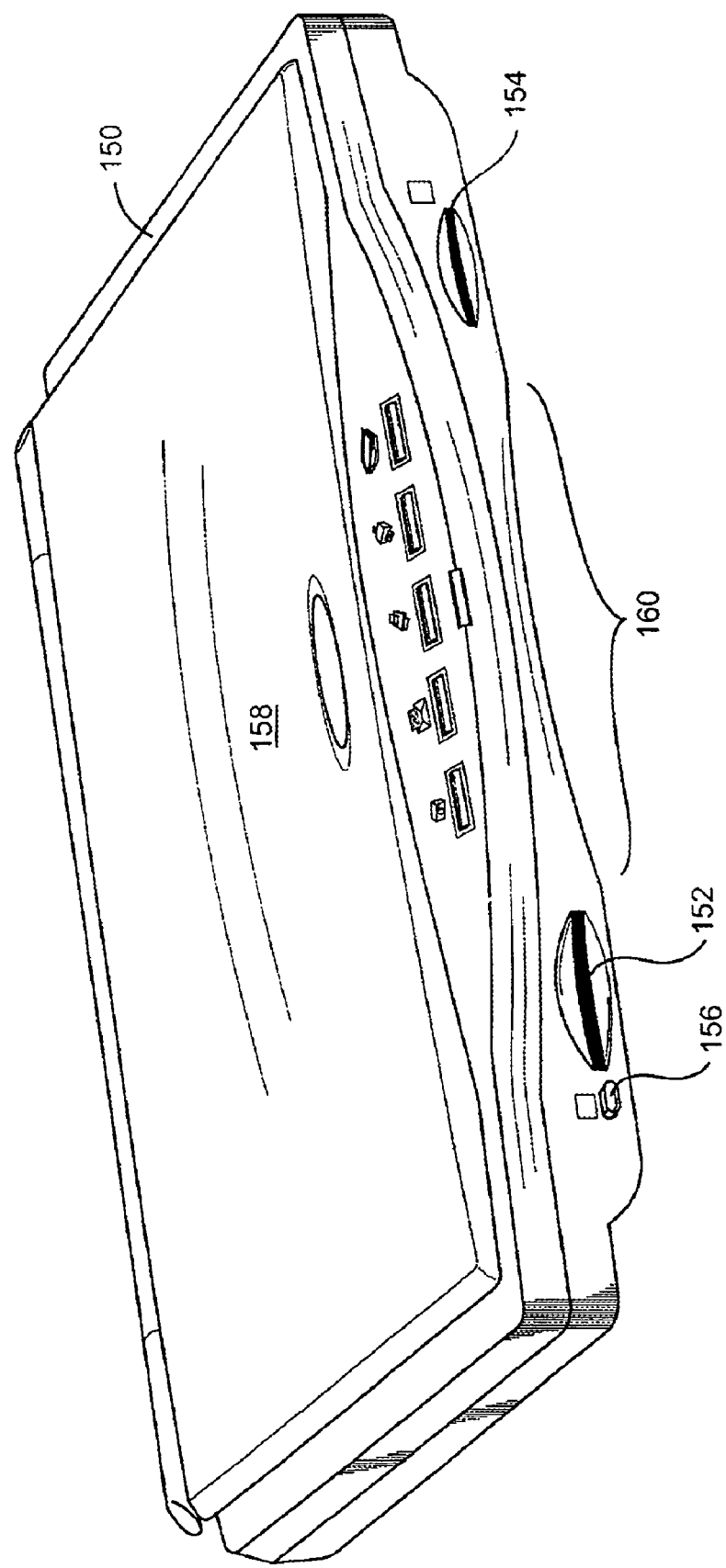
FIG. 1A is an isometric illustration of the first embodiment of the invention, showing the digital film reader slots on the body of a flatbed scanner.

FIG. 1A is a front elevation in perspective of a currently preferred, first embodiment of the invention, illustrating a flatbed scanner body 150, lid 158, two digital film slots 152, 154, and a USB connector 156 in the front. In this image, there are six buttons visible 160, representing the six functional buttons of the hardware system, including a scan button, a copy/print button, a fax button, an OCR button, an e-mail button, and a customizable button. An embodiment capable of reading fewer or more types of digital film would have fewer or more media reader slots visible, and an embodiment having USB ports for connecting to other peripherals would have more of the USB ports 15b.

Figure 1B:
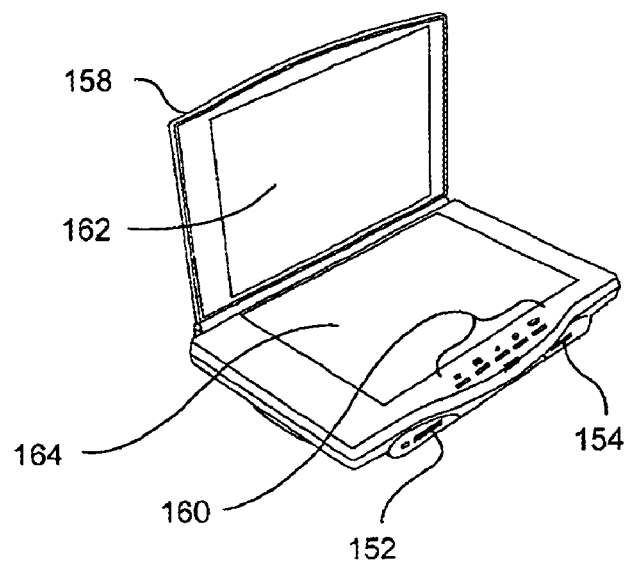
FIG. 1B shows the scanner with an open lid.
Figure 1C:
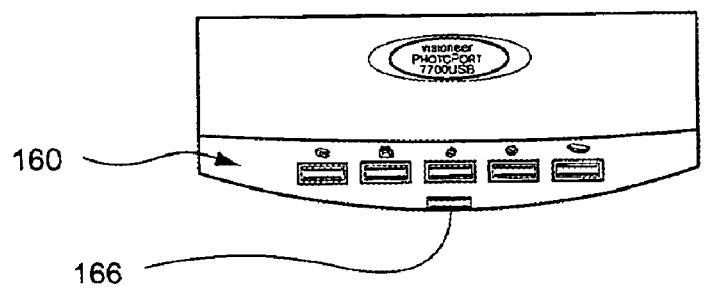
FIG. 1C is a blown up drawing of the pushbutton panel.
Figure 1D:
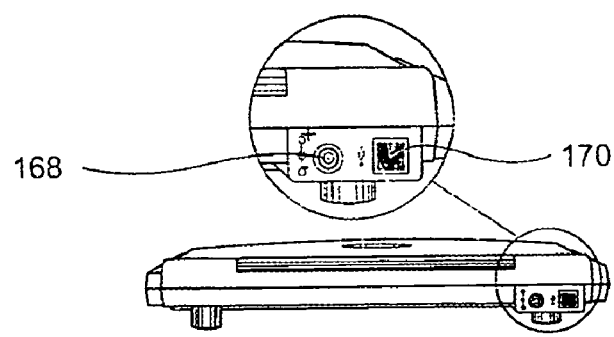
FIG. 1D is a line drawing of the rear of the scanner, showing power and USB connections.

FIG. 1B is a front elevation as in FIG. 1A, showing the lid 158 open, revealing the document cover 162 and the scanner glass 164. FIG. 1C shows a detailed line drawing of the push button panel 160 as well as the status light 166. FIG. 1D is a line drawing of a USB port 170 as well as the separate power input port 168, located on the rear of the unit. FIG. 1E depicts the inventive hardware connectivity to a computer via a USB port. FIG. 1E depicts the inventive hardware connectivity to a computer 115 via a USB port. A flatbed scanner is depicted 100 as containing two card reader slots 110. The scanner is connected via a USB port and cable 105. Also shown are a computer monitor 120, mouse 125, and CD drives 115.

Figure 2:
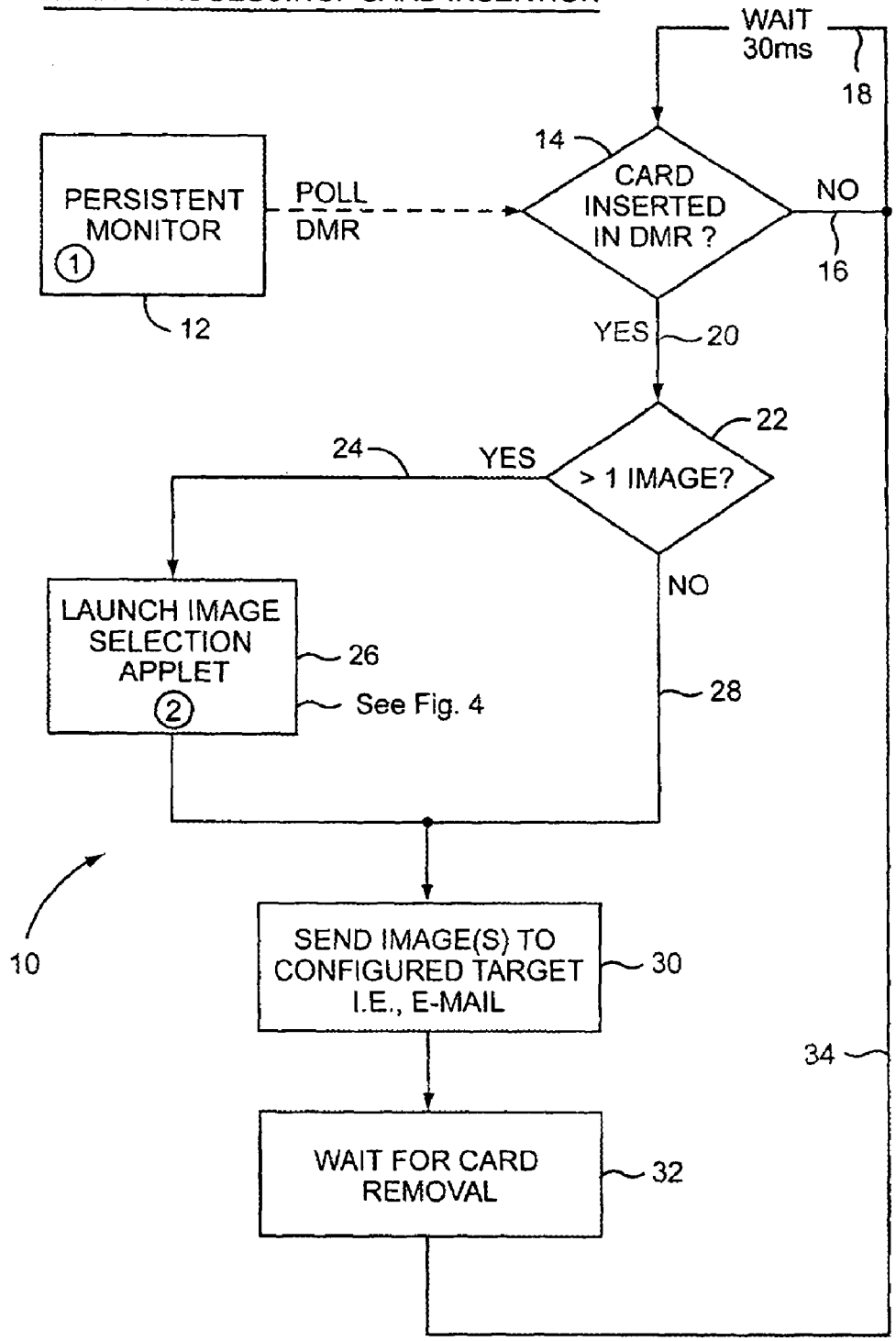
FIGS. 2 through 5 are software system process flow charts demonstrating the processes invoked by various consumer actions, and which programmers skilled in the art will recognize as software layout for use to write appropriate software code to realize the functionality shown.

FIG. 2 depicts functionality of the software system 10 of the invention, including a "persistent monitor" (PM) 12 that continually checks the status of the hardware, e.g. by timed polling. FIG. 2 shows the PM polling the digital media reader (DMR), included in each of the three embodiments described above, to determine presence or absence of media inserted therein, 14. The monitor checks whether a card has been inserted into any of the media readers. If not, 16, the PM waits a preset duration of time, say 30-300 milliseconds, 18, and checks again. Once a card is detected 20, the inventive software reads the card media to determine whether there is more than one digital image file stored in the media 22. If so, 24, the software system invokes the image selection program 26, typically an applet written in C++ or any other suitable computer language. The consumer then selects one or more of the image(s) detected. If there is only one image on the digital media 28, the software system automatically selects that image. In either event, the software system sends the image(s) to the configured target 30, whether that target is e-mail, processing, or any of the other functions of the software system described herein. In the case of the third embodiment, where there are no buttons, the consumer pre-selects the automatic procedure that the inventive software is to initiate upon media insertion. If no such procedure has been selected, the inventive software system will pause and request the consumer to select a function. Once the image processing is complete, the software system waits for the card to be removed 32 before again monitoring (polling) the media reader 34, 18.

Figure 3:
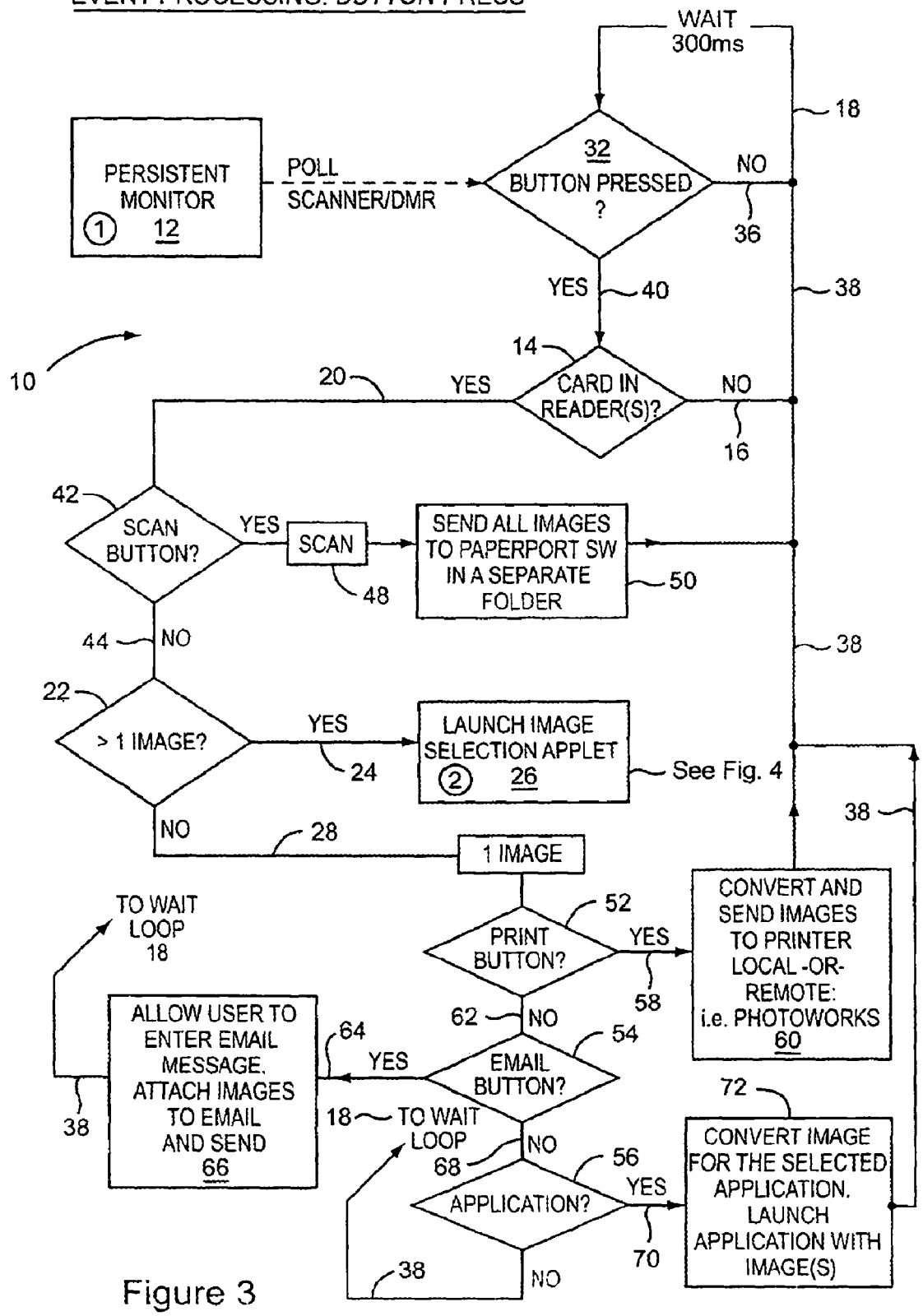

FIG. 3 is a software layout in flow chart format that shows the functionality of the inventive software 10 in situations in which the PM 12 detects the pressing of one of the buttons 32 of the scanner/DMR hardware of the invention. If no button is pressed, 36, the system waits, e.g., 30-300 ms, and checks again (the "wait loop" 18). Once the PM detects a button having been pressed 40, the software system checks to see if there is a card in the media reader, 14.

If there is a card in the reader 20, as in FIG. 2 the system checks to see if the scan button has been pressed, 42. If not, 44, the system checks to see how many digital image files are on the card, 22. If there is more than one image 24, the system launches the image selection applet 26. As described in more detail below with reference to FIG. 4, the application launcher initiates the image selection software in a separate process to improve system stability. In general, the image selection software (applet) allows the consumer to select one or more images. Once the consumer selects the image(s), (or if there was only one image), the inventive software selects that image and determines which button was pressed to determine which application to launch and to which application to provide the image.

Continuing with reference to FIG. 3, if there is no media card 16 in the DMR and the hardware of the invention contains only the media reader, then the PM returns to its normal polling state via wait loop 38, 18. If, instead, the embodiment contains a scanner and there is no media card in the media reader, the inventive software system checks whether the button pressed is associated with a scan function 42. If the button is not associated with some function that allows scanning an image, then, the system returns to the PM mode 12. If the button does call for scanning (as most of the possible button functions do), the inventive software causes the scanner of the hardware to scan the image 48 at the preselected image resolution or at other parameters as set by the user in the configuration, or as the automatically-installed generic configuration (default) requires.

Once the inventive software system has narrowed down its selection of images to one image 28, as shown by FIG. 3, the inventive system determines which button 52, 54, 56, was selected. By way of non-limiting example, if the system determines that the print button 52 was pressed 58, the system sends the image 60 to a local printer or to a remote printer, such as to PhotoWorks, after invoking the appropriate application which includes, but is not limited to, the print feature of an attached computer or a link to the processor. If the print button was not pressed, 62, the software checks if it was the "e-mail" button 54. If so, 64, the system creates an e-mail 66, with the image attached and allows the consumer to edit and address the e-mail. If the button was not the "e-mail" button, 68, the system then checks which of the application buttons 56, including any customized buttons, was pressed. If yes, 70, the system then converts the image to the appropriate form 72 and launches the application with the image file open in the application. Once completed, the system resets to the wait loop 38, 18.

Figure 4:
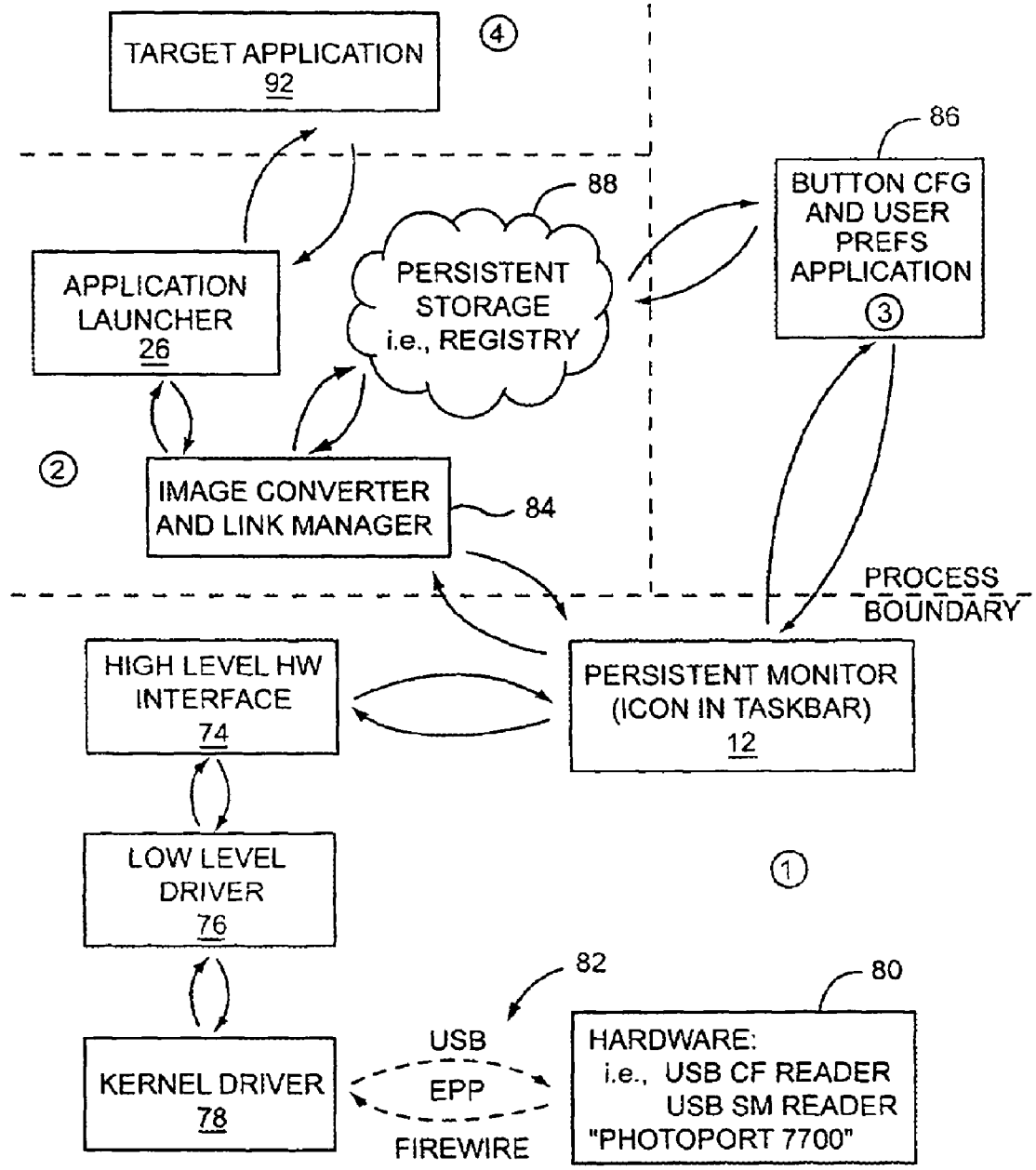

FIG. 4 illustrates a layout of an implementation of the inventive system software in terms of its component architecture boundaries. In this Figure, there are four discrete process regions, delineated with dashed lines. The dashed lines represent the respective process boundaries. Each process runs independently of the others, so that if any one process crashes, the remaining processes continue to function as normal. By keeping the target applications, the image converters, the configuration programs, and all the other aspects of the inventive software that do not require communication with the kernel driver in processes separate from the system kernel driver 78, program instability will not result in a computer system crash. This ensures a safe operating system environment.

As shown in the primary process at the bottom of FIG. 4, the PM interface 12 is associated with both a high, 74, and a low-level, 76, interface. The high-level interface software 74 communicates between the PM 12 and the low-level drivers 76. The PM appears as an icon in the taskbar, typically on the bottom right-hand portion of the computer monitor.

The icon functionality can include, by either right or left clicking on the icon, the following features: a button configuration application (see process section); a consumer preference application; image manipulation applications; a link manager; and/or other applications. This functionality provides a convenient on-screen view of the hardware buttons, allowing selection of buttons on screen with a mouse. The low-level driver portion 76 controls, and receives feedback from, the hardware 80 through the operating system's kernel driver 78. Since the kernel driver operates within the system kernel, the inventive system limits processing through the kernel to ensure system stability. Connectivity between the CPU (not shown) and the hardware 80 is via USB, Enhanced Parallel Port (EPP), Firewire, Bluetooth, iLink, IEEE 1394, Network cable, or other suitable connection, 82.

Also shown in FIG. 4, the component section image converter and link manager process 84 receive input from the button configuration and consumer preference applications 86 (component section 4) via persistent storage, e.g. system registry 88, and then determines whether the application launcher 26 is necessary. The application launcher can then select and launch the target application(s) 92 in component section.

Figure 5:
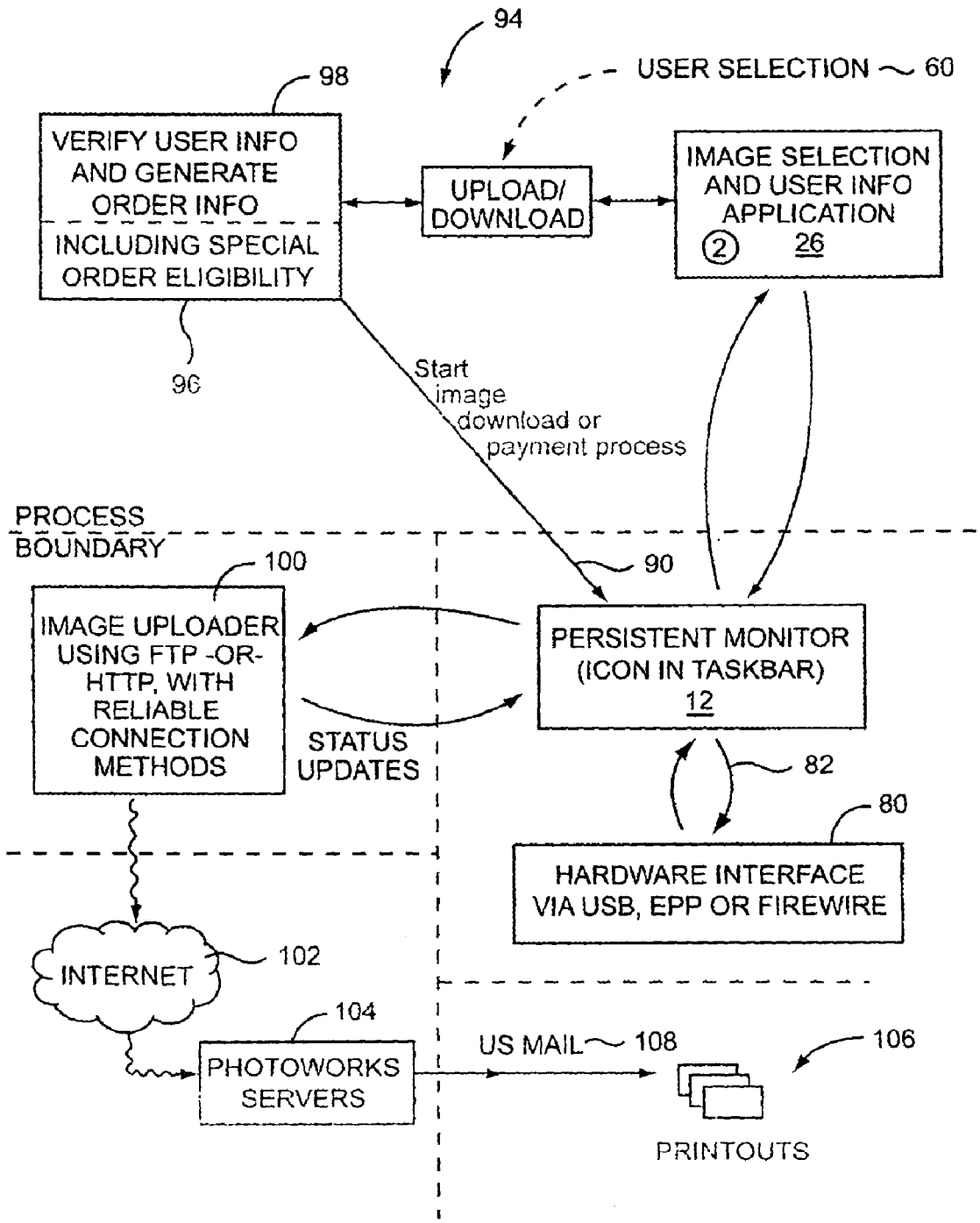

FIG. 5 illustrates the architecture of the digital developer software system 94, the functionality of which includes all aspects of sending images across the Internet for professional processing, printing, product placement, or other purposes. The independent process boundaries are shown in dashed lines as in FIG. 4. Once the consumer has selected, for example, professional printing 60 (as determined by the PM and the various previously described software layout flow charts), the consumer selects which images 26 to send for processing, printing, placing on products, or any other option available through the professional processing and printing company, such as PhotoWorks.

Once the consumer has selected which images to send, the software system of the invention verifies user information 98 and can optionally invoke the Special Offer applet 96, when the consumer selects "order" from a menu to order prints. The application launcher launches the Special Offer applet 96 as a target application, in a new process. That process is independent of the rest of the inventive software system so that any instability in the applet, or through the Internet (102, FIG. 5) upon connection to the processor, will not result in a crash of the inventive software. The applet first downloads, 90, the current price table (in XML or other format) from the print processor. During the order process, the applet will display all of the current Special Offers and the required eligibility parameters. The consumer will select an applicable Special Offer and the applet will query the processor to determine whether the consumer is eligible for the offer 98. If the consumer is eligible, the applet downloads an additional module that can execute the offer during price calculation.

By way of non-limiting example, such a Special Offer could be a free set of up to 24-4.times.6 inch prints, for first time consumers. The applet will show the offer to the consumer who has selected several images and "ordered" prints. If the consumer selects the free set of prints, the applet will determine whether the consumer is a first time consumer by consulting a relational data base of the processing service vendor (e.g., in its servers 104). If the consumer is a first time consumer, then a module will download and reduce the price of the first 24 4.times.6 prints ordered to zero and the final price will reflect that change.

Once the order has been prepared, as shown in FIG. 5, the image uploader software 100 ensures the delivery of the images via the Internet 102 to the processing center's computers 104. The uploader software ensures proper deliver of the images by resending images when dialup connections fail, when the processing center does not receive complete, uncorrupted images, or under any circumstances under which the processor does not report having successfully received all of the images sent by the uploader. The uploader software works automatically, in the background, and requires no input from the consumer. At the processing center, an example of which is PhotoWorks, the image(s) are processed and printed out in professional quality as the order so requests. Those printouts 106 can then be sent via mail 108 to the consumer.

FIG. 5 also demonstrates the process boundaries as described above for FIG. 4. In FIG. 5, each illustrated portion of the inventive software is shown as a different process. By separating the processes as shown in FIG. 5, if any one of those individual process sections crashes, the system remains stable.

Figure 8:
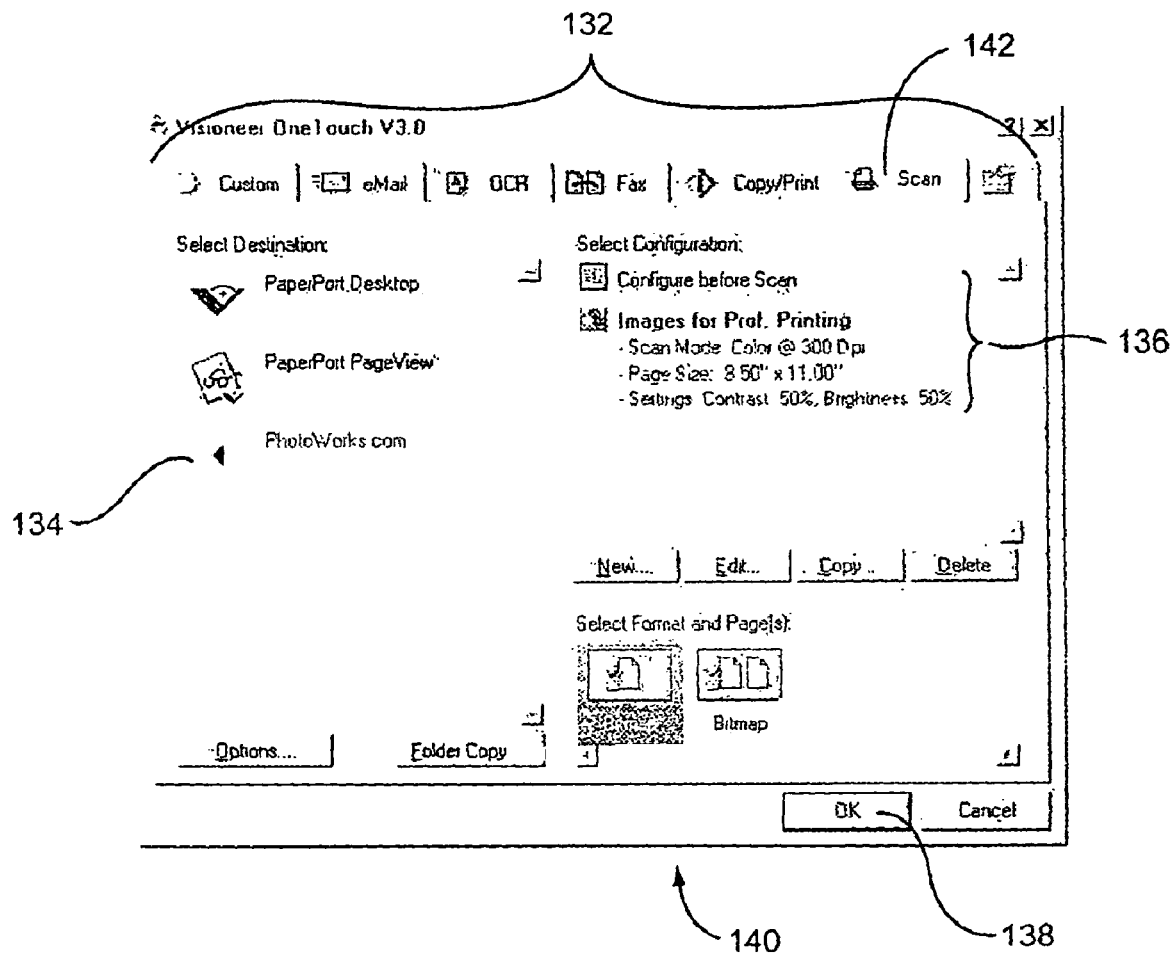
FIG. 8 is a screen capture of the software aspect that allows the consumer to configure and customize the functionality of the hardware buttons.

FIG. 8 is a screen capture 140 of the software aspect that allows the consumer to configure and customize the functionality of the hardware buttons see 86 in FIG. 4. In this screen capture, a set of tabs 132 (here, 7) can be seen. Each of these tabs allows an aspect of the functionality of the software system to be customized and manipulated by the consumer. In this screen shot, the Scan feature, or the Scan button (42 in FIG. 3), is being customized 142. The consumer has selected the Scan feature to send the image scanned to destination PhotoWorks 134 (in the left side of the image), and has configured the scanner to scan in color, at 300 dpi, on a full page, with 50% contrast, and 50% brightness, 136. Once this information is input into the system ("OK", 138), when the consumer selects the Scan button 42 (FIG. 3), the inventive software and hardware will send the image data taken from the scan of the image and send it directly to PhotoWorks via Internet (102, 104, FIG. 5) for reproduction at the print properties 136.

INDUSTRIAL APPLICABILITY

It is clear that the system of the invention comprising a digital image acquisition device that can include digital scanner and/or a digital media reader, along with transfer software, has wide industrial application, among others for small office, home office, and personal use.

Because the system allows the consumer to manipulate digital images, the system will work where consumers need advanced image processing or the convenience associated with a one-touch hardware and software system. The image processing includes automatic e-mails, image editing, archiving, copying, printing, or sending images for professional processing and printing.

It should be understood that one skilled in the art can make a number of variations in the hardware and system software elements within the scope of this invention without departing from the spirit thereof. Accordingly, this invention should be defined by the scope of the forthcoming claims as broadly as the prior art will permit, and in view of the specification if need be.

The invention claimed is:

1. An image processing method in an image acquisition apparatus connected to at least one USB equipped computer, comprising: a) an image input step for inputting image data into a control circuit within said apparatus; b) a transmittal step for sending said image data from said control circuit through the USB system of said computer; c) an interface step for said control circuit to receive instructions from, and send data to, control software on said computer upon detection of the insertion of the appropriate media into at least one of a Compact Flash Memory card reader, a Smart Media card reader, a PC or PCMCIA Card reader, a Memory Stick reader, a Multi Media card reader, a Secure Digital card reader, and a IBM Microdrive reader, whereupon in response to insertion and detection thereof, the inventive software automatically launches a user interface (computer program application) with or without the scanner actually scanning an image, and directs the scanned data to a pre-selected application as initially specified by the user wherein said application launches and proceeds with data processing without requiring the user to intercede.

2. The method of claim 1, wherein the processing method is accomplished by insertion of any of said media into one of two card reader slots contained within a flatbed scanner and the data read from said media is processed without requiring the scanner to scan the image, and the image data is processed automatically as in claim 1 without requiring user intervention.

3. The method of claim 1 wherein the processing method may be initiated solely upon insertion of any of said media, and the data read from said media is processed without requiring the scanner to scan the image, and whereupon a user interface is automatically launched on said connected computer without further steps by a user; said user interface providing one or more options for further processing of data obtained from said media.

4. The method of claim 1 wherein the processing method may occur without the scanner having to scan the image, and the user may select one or more programmed buttons on the scanner to instruct the data read from the media to be directed to a computer program for processing, faxing, archiving, emailing or printing.

* * * * *